United States Patent
Guay et al.

(10) Patent No.: US 8,470,410 B2
(45) Date of Patent: Jun. 25, 2013

(54) METHOD AND SYSTEM FOR PRODUCING ELECTROCATALYTIC COATINGS AND ELECTRODES

(75) Inventors: Daniel Guay, Saint-Lambert (CA); Éric Irissou, Montreal (CA); Jean Gabriel Legoux, Repentigny (CA); Lionel Roué, Sainte-Julie (CA)

(73) Assignees: Institut National de la Recherche Scientifique (INRS), Quebec (CA); National Research Council Canada, Ottawa (CA)

( * ) Notice: Subject to any disclaimer, the term of this patent is extended or adjusted under 35 U.S.C. 154(b) by 174 days.

(21) Appl. No.: 12/974,713

(22) Filed: Dec. 21, 2010

(65) Prior Publication Data
US 2011/0147205 A1    Jun. 23, 2011

Related U.S. Application Data

(60) Provisional application No. 61/288,380, filed on Dec. 21, 2009.

(51) Int. Cl.
*B05D 1/12* (2006.01)
*B05D 3/06* (2006.01)

(52) U.S. Cl.
USPC ......... 427/554; 427/192; 427/202; 427/205; 427/427

(58) Field of Classification Search
USPC .................. 427/191, 202, 205, 427, 554
See application file for complete search history.

(56) References Cited

U.S. PATENT DOCUMENTS

2002/0168466 A1* 11/2002 Tapphorn et al. ............. 427/180
2010/0159152 A1    6/2010 Schulz et al.

FOREIGN PATENT DOCUMENTS

WO    2005/079209    9/2005
WO    2006/072169    7/2006

OTHER PUBLICATIONS

M. Blouin, M. L. Tremblay, A. Bercier, L. Roué, D. Guay, R. Schulz, L. M. D. Cranswick, I P. Swainson (2007), "Effect of boron on the structural and electrochemical properties of nanocrystalline $Ti_2RuFeB_x$ electrodes", Electrochim. Acta, 52, 4497-4505, doi:10.1016/j.electacta.2006.12.046.

M. L. Tremblay, C. Chabanier, D. Guay (2005), "Effect of chromium additives to nanocrystalline Ti:Ru:Fe:O on the reduction of hypochlorite", J. Electrochem. Soc., 152, E265-E272.

E. Irissou, M. Blouin, L. Roué, J. Huot, R. Schulz, D. Guay (2002), "Plasma-sprayed nanocrystalline Ti—Ru—Fe—O coatings for the electrocatalysis of hydrogen evolution reaction", J. Alloys and Compounds, 345, 228-237.

(Continued)

*Primary Examiner* — Frederick Parker
(74) *Attorney, Agent, or Firm* — Goudreau Gage Dubuc; Gwendoline Bruneau

(57) ABSTRACT

A method for producing nanostructured coatings on a substrate, comprising: preparing a nanocrystalline powder of a powder size comprised between 1 and 60 μm; and combining cleaning the surface of the substrate and cold spraying the nanocrystalline powder on the surface of the substrate, and a system for producing nanocrystalline coatings on a substrate, comprising a spray head, a cleaning head and a handling system monitoring the spray head and the cleaning head relative to the substrate to be coated, the spray head being a first cold spray head, the first cold spray head depositing on the substrate at least one nanocrystalline powder, the cleaning head optimizing the surface being coated with the at least one layer of nanocrystalline powder.

16 Claims, 3 Drawing Sheets

OTHER PUBLICATIONS

J.J. Sunol, M.E. Bonneau, L. Roué, D. Guay, R. Schulz (2000), "XPS surface study of nanocrystalline Ti—Ru—Fe materials", Appl. Surf. Sci., 158, 252-262.

L. Roué, D. Guay, R. Schulz (2000), "Hydrogen electrosorption in nanocrystalline Ti-based alloys", J. Electroanal. Chem., 480, 64-73.

L. Roué, M.E. Bonneau, D. Guay, M. Blouin, R. Schulz (2000), "Effect of oxygen and titanium contents on the stability of nanocrystalline Ti—Ru—Fe—O used as cathode materials for chlorate electrolysis", J. Appl. Electrochem., 30, 491-498.

M. Blouin, D. Guay, R. Schulz (1999), "Kinetics of nanocrystalline Ti2RuFe alloy formation in presence of an oxide phase", J. Mater. Sci., 34, 5581-88.

H. Razafitrimo, M. Blouin, L. Roué, D. Guay, R. Schulz (1999), "Large specific surface area nanocrystalline Ti—Ru—Fe cathode materials for sodium chlorate", J. Appl. Electrochem., 29(5) 627-635.

L. Roué, É. Irissou, A. Bercier, S. Bouaricha, M. Blouin, D. Guay, S. Boily, J. Huot, R. Schulz (1999), "Comparative study of nanocrystalline Ti2RuFe and Ti2RuFeO2 electrocatalysts for hydrogen evolution in long-term chlorate electrolysis conditions", J. Appl. Electrochem., 29(5) 551-560.

M. Blouin, D. Guay, J. Huot, R. Schulz, I.P. Swainson (1998), "X-ray and neutron diffraction study of nanocrystalline Ti—Ru—Fe—O compounds", Chem. Mater., 10 (11) 3492-3497.

L. Roué, D. Guay, R. Schulz (1998), "Electrochemical behavior of nanocrystalline Ti2RuFe alloy prepared by high energy ball-milling", J. Electroanal. Chem., 455, 83-92.

M. Blouin, D. Guay, R. Schulz (1998), "Effect of oxygen on the structural and electrochemical properties of Ti—Ru—Fe alloy prepared by mechanical alloying", Nanostructured Materials, 10(4) 523-541.

S.-H. Yip, D. Guay, S. Jin, E. Ghali, A. Van Neste, R. Schulz (1998), "Structural and electrochemical properties of Ti—Ru—Fe—O alloys prepared by high energy ball-milling", J. Mater. Res., 13, 1171-1176.

M. Blouin, D. Guay, J. Huot, R. Schulz (1997), "High energy ball-milled Ti2RuFe electrocatalyst for hydrogen evolution in the chlorate industry", J. Mater. Res 12(6) 1492-1500.

S. Helle, B. Davis, D. Guay, L. Roué (2010), "Electrolytic production of aluminum using mechanically alloyed Cu—Al—Ni—Fe based materials as inert anodes", J. Electrochem. Soc., 157_11_E173-E179.

S. Helle, M. Pedron, B. Assouli, B. Davis, D. Guay, L. Roué (2010), "Structure and high-temperature oxidation behavior of Cu—Ni—Fe alloys prepared by high energy ball milling. Application as inert anodes for aluminum electrolysis", Corrosion Science, 52, 3348-3355.

S. Helle, B. Brodu, B. Davis, D. Guay, L. Roué (2010), "Ball-milled materials as inert anodes for aluminum production in KF—AlF3 low-temperature electrolyte", TMS Light Metals, 935-938.

B. Assouli, M. Pedron, S. Helle, A. Carrere, D. Guay, L. Roué (2009), "Mechanically a lloyed Cu—Ni—Fe based materials as inert anode for aluminium production", Light Metals 2009, 11-41-44.

* cited by examiner

METHOD AND SYSTEM FOR PRODUCING ELECTROCATALYTIC COATINGS AND ELECTRODES

CROSS REFERENCE TO RELATED APPLICATIONS

This application claims benefit of U.S. provisional application Ser. No. 61/288,380, filed on Dec. 21, 2009. All documents above are incorporated herein in their entirety by reference.

FIELD OF THE INVENTION

The present invention is concerned with a method and a system for producing electrocatalytic coatings and electrodes.

BACKGROUND OF THE INVENTION

Nanostructured materials are used to produce electrocatalysts from powders of a target composition prepared by mechanical alloying for example and they have a defined structure and morphology. For tests at the laboratory scale, the powders can be pressed into pellets of a geometrical surface of 2 cm$^2$ for example.

A number of methods for preparing these powders have been developed in order to allow producing electrodes of sizes compatible with industrial requirements. For example, electrocatalytic coatings may be fabricated on the surface of substrates by thermal spraying of nanostructured metastable powders obtained by mechanical milling or other processes to yield nanostructured powders. In a thermal spray process, the powder is introduced into hot plasma so as to be heated (and possibly melted, either partially or totally) and directed at high speed towards the substrate for deposition. As a result of heat, the structure and composition of the powder are liable to be modified, and oxide layers may be created at the interface between the substrate and the coating being formed, which results in a weak adhesion between the coating and the substrate, which may ultimately cause delamination of the catalyst coating from the substrate during electrolysis or formation of oxides at the surface of the coating, in which case the electrodes need to be submitted to an activation step before being used.

During the thermal spray process, it is extremely difficult to control the surface conditions, such as for example oxidation, roughness, contamination, etc., of the substrate as the coating is being deposited, which may result in a reduced adhesion between the coating and the substrate and a weak interface between them. As a result, the coating obtained is found not to be stable and can be damaged under operating conditions.

Alternatively, a cold gas dynamic spray (cold spray) process has been developed, wherein a supersonic gas jet is used to accelerate solid fine powders of various materials above a critical velocity at which the particles impact, deform plastically and bind to the substrate to form a coating.

As illustrated in FIG. 1, the cold spray process basically uses the energy stored in a high pressure compressed gas, such as air, nitrogen, helium and mixtures thereof for example, to propel fine powder particles at very high velocities (500-1500 m/s). The compressed gas is fed to a spray gun and the gas exits through a nozzle at supersonic velocity. A high pressure powder feeder introduces the feedstock powder material into the high velocity gas jet. The powder particles are accelerated in the gas flow to high velocity, and only moderately heated. On impact with a substrate, they deform, by plastic deformation, and bond to form a coating. The particles remain in the solid state and are relatively cold, so bulk reaction on impact is limited to solid state chemistry. The process imparts little to no oxidation to the spray material, so surfaces stay clean, which promotes bonding. No melting and relatively low temperatures result in very low shrinkage on cooling. Moreover, due to high strain induced upon impact, the coating tend to be stressed in compression and not in tension, as typically occurs at the liquid/solid interface in most other thermal spray processes. Low temperatures also permit retaining the original chemistry and phases of the powders in the resulting coating, with only minor change due to deformation and cold working (see for example WO 2005/079209).

Sodium chlorate ($NaClO_3$) is mostly used to produce chlorine dioxide for bleaching paper pulp, since it allows reducing by about 84% the emission of chlorinated materials compared to the use of elementary chlorine. The first step in the preparation of sodium chlorate ($NaClO_3$) is the electrolysis of chloride ions ($Cl^-$) from a brine solution that generates chlorine ($Cl_2$). Chlorine is then converted to sodium chlorate through a series of chemical steps and recrystallized. Up to 70% of the total production costs of sodium chlorate are due to electric energy needs during the process. Electrolysis is responsible for almost 95% of the electrical consumption of the total process. That is a reason why efforts are developed to whatever efficiency improvement, which could allow reducing these electrolysis costs.

Nanostructured powders of Ti—Ru—Fe—O have been shown to be a good catalyst for the hydrogen evolution reaction in the process of sodium chlorate synthesis (see for example references 1-15; WO 2006/072169). Coatings prepared by thermal spraying were shown to be active. However, the stability of such coatings varies according to the size thereof. While small surfaces (1 cm$^2$) show a good stability, typically of more than about 30 days for example, coatings on larger surfaces (500 cm$^2$ and up) tend to peel off and their activity decreases after only a few days of operation.

Another application is, for example, aluminium electrolysis. Aluminium production by the Hall-Héroult process involves the electrolytic decomposition of aluminium oxide dissolved in a molten cryolite ($Na_3AlF_6$) bath operating at temperatures around 960° C. Molten aluminium is produced at the cathode and carbon dioxide is formed at the consumable carbon anode. The process requires a large amount of energy and produces significant emissions of greenhouse gases. A number of environmental and economic incentives are in favour of developing aluminium production technology with inert oxygen-evolving anodes: reductions of greenhouse gas emissions ($CO_2$, $CF_x$, etc.), cost reduction by eliminating the consumable carbon anode plant, capital saving in the smelter by enabling higher Al production per unit volume of cells, and a reduction in operating and labor costs by eliminating the frequent anode change operations, etc. However, several decades of research have shown that the development of inert anodes for Al production is not a straightforward task. Indeed, an inert anode material must satisfy multiple requirements including a low corrosion rate, typically below 10 mm/year, good resistance to fluorination and anodically produced oxygen, stable potential and low overpotential for oxygen evolution, low electrical resistivity, adequate mechanical strength and thermal shock resistance, simple electrical connection, low cost and ease in manufacturing on an industrial scale. In addition, the produced aluminium must have acceptable impurity levels for major applications.

Inert anodes made of nanostructured Cu-based alloys prepared by mechanical milling display a stable cell voltage, maintain their mechanical integrity and induce a limited pollution of the produced aluminium for a 20 h electrolysis in low-temperature (700° C.) KF—AlF$_3$ electrolyte (see for example, references [15-18]). However, the fabrication of large and dense electrodes required for Al electrolysis at the industrial scale from these ball-milled materials remains a challenge.

There is a need for coatings and electrodes that meet the requirements of the industry and are more efficient.

The present description refers to a number of documents, the content of which is herein incorporated by reference in their entirety.

SUMMARY OF THE INVENTION

More specifically, in accordance with the present invention, there is provided a method for producing nanostructured coatings on a substrate, comprising preparing a nanocrystalline powder of a powder size comprised between 1 and 60 μm; and combining cleaning the surface of the substrate and cold spraying the nanocrystalline powder on the surface of the substrate.

There is further provided a system for producing nanocrystalline coatings on a substrate, comprising a spray head, a cleaning head and a handling system monitoring the spray head and the cleaning head relative to the substrate to be coated, the spray head being a first cold spray head, the first cold spray head depositing on the substrate at least one nanocrystalline powder, the cleaning head optimizing the surface being coated with the at least one layer of nanocrystalline powder.

There is further provided an electrode made from nanocrystalline catalytic powders deposited on a substrate, comprising a substrate and a nanocrystalline electrocatalytic coating, wherein the nanocrystalline electrocatalytic coating has a composition and a structure similar to a composition and a structure of the nanocrystalline catalytic powders, and an interface between the substrate and the nanocrystalline electrocatalytic coating is free of native oxides.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

In a nutshell, there is provided a method and a system for producing high-efficiency, long-term stability electrodes and electrocatalytic coatings.

Figure 1:
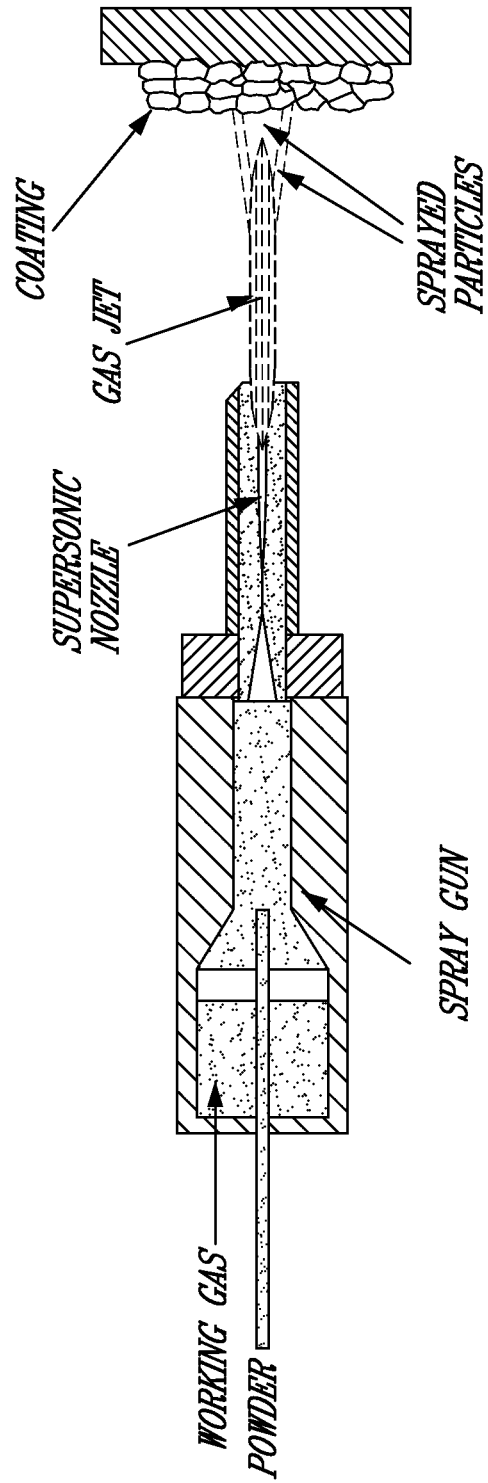
FIG. 1 is a schematic diagram of a cold spray process, as known in the art.
Figure 2:
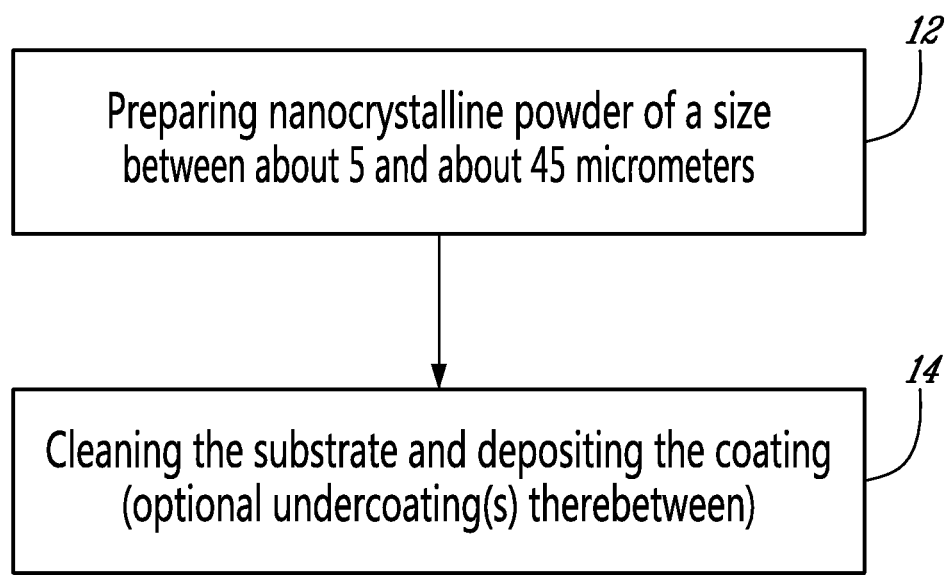
FIG. 2 a flowchart of a method according to an embodiment of another aspect of the present invention.

According to an embodiment of a first aspect of the invention as illustrated in FIG. 2, the method generally comprises preparing nanocrystalline powders, for example by mechanical milling, either metastable or not, and depositing coatings thereof on a metallic substrate by cold spraying the nanocrystalline powders on the surface of a substrate.

A number of parameters, including for example mean size, grain size distribution, morphology and ductility, determine the dynamics of the powders within the gas flow and of the formation of the coating under cold spraying. Powders are thus selected to achieve a coating characterized by a fair density without open pores from the top surface to the substrate and a good adhesion to the substrate, i.e. a tensile strength of higher than 3000 psi based on ASTM C633 tests, at a high deposition rate, typically between 5 and 75 g/min.

Powders may be produced by mechanical milling in an attrition device as known in the art. Depending on the size and grain size distribution of the powders obtained, an agglomeration and sieving step may be needed to yield a powder size optimized for cold spraying, typically between about 1 and about 60 μm, for example between 5 and 20 μm.

According to the substrate materials and the powders, cleaning of the surface of the substrate and cold spraying parameters are optimized. For example, parameters of the laser ablation are optimized depending on the material of the substrate, and parameters of the cold spray are optimized depending on the type of powders.

For example, for producing nanocrystalline Ti—Ru—Fe—O electrocatalyst coatings for hydrogen evolution in long-term industrial chlorate electrolysis conditions, Ti—Ru—Fe—O powders are prepared and electrocatalytic coatings thereof are deposited by cold spraying on the surface of a substrate. Stainless steel powders and titanium powders, for example, may be selected to produce under-coatings on substrates of Ti or mild steel, which are standard substrates used in the industry. Other substrates may also be used. For the coatings, powders with an adequate size distribution for cold spray are commercially available.

In applications such as aluminium electrolysis for example, the substrate could be copper or C63000 for example, and the powders be prepared from nanocrystalline copper-based alloys for example.

Under-coatings, also referred to as bond coatings, may be deposited to protect the substrate from oxidation occurring within electrolysis cells. An under-coating allows reducing the thickness of the coating itself, for example reducing from a thickness of a few hundreds of μm to a thickness less than 5 μm, which in turn results in cost savings in the case of Ru as Ru is very expensive for example, without risking localized oxidation otherwise caused by defaults in a thinner coating, which may weaken the interface between the substrate and the coating. Such protecting under-coating allows minimizing negative impacts of defaults of the coating on the long-term stability and the adhesion of the coating.

In other cases, when the thickness of the coating itself is not an issue as the coating material is cheaper, for example in applications of aluminium electrolysis, the thickness of the layer of the coating material may be increased without using undercoatings, the objective remaining that the substrate itself be protected against damages.

In some applications, a ductile under-coating, in Cu or Cu-based for example, depending on the application, may be selected so as to increase the efficiency of the deposition process during the preparation of the electrocatalytic coating itself, since a ductile under-coating may ease managing residual stresses so as to maintain adhesion of the catalyst material during electrolysis.

The cleaning of the surface of the substrate may be done either by cold spray of materials that do not adhere to the substrate, or by laser ablation, either simultaneously with the spraying of the electrocatalytic coating or beforehand.

For instance, a first cold spray head may be used for directing a ceramic such as alumina, silica, titania, silicon carbides, for example, to the surface of the substrate, such ceramic, instead of adhering to the substrate, eroding the surface of the substrate, thereby increasing its roughness and eliminating surface oxides and hydroxides layers therefrom by grit blasting. A second spray head may be simultaneously used to deposit the coating itself. It may be contemplated using a single cold spray head successively spraying a non-adhering material for cleaning purposes and the coating material itself.

Alternatively, the surface of the substrate may be submitted to laser ablation, in between successively deposited layers of material and on the final layer (top surface). Operational parameters of the laser ablation and of the cold spray are optimized so as to deposit: 1) on the substrate: dense coating(s), and 2) directly on the substrate or on the under-coatings: nanocrystalline coatings characterized by a good adhesion and controlled residual stresses on large surfaces. Operational parameters of the laser ablation and of the cold spray are also optimized to provide, on the top surface, which is to be the working surface of the electrode, a controlled micro-roughness.

The spraying parameters, including for example the velocity of the automaton and the number of passes, are selected to yield coatings of different thicknesses.

Cold spray allows overcoming a number of limitations otherwise encountered when using hot spray, since the powders are not atomized or melted during cold spraying. Under cold spray, the temperature of the particles remains well below their melting point, and upon impacting the substrate, the particles plastically deform, thereby forming a coating by mechanical cold binding or welding. This allows fabricating coatings from materials reactive to oxidation or heat. During cold spray, the nanocrystalline particles do not experience crystalline growth and thereby maintain their unique properties. Moreover, metals and alloys may be sprayed without oxidation, allowing forming coatings having electrical, thermal and electrocatalytic properties similar to those of the bulk materials.

During spray, the surface cleanness of the substrate needs to be controlled to ensure a good adhesion of the deposited coating. Such cleaning may be achieved by laser ablation, as described hereinabove, which allows eliminating native oxide layers a few milliseconds only prior to the deposition. By combining laser ablation and cold spray, or cold spray of non-adhering materials with cold-spray of adhering materials, the present invention therefore allows obtaining a metallic surface at the time the powder particles hit the substrate, thereby promoting the metallurgical bonding between the coating and the substrate and hence optimizing the adhesion therebetween.

Figure 3:
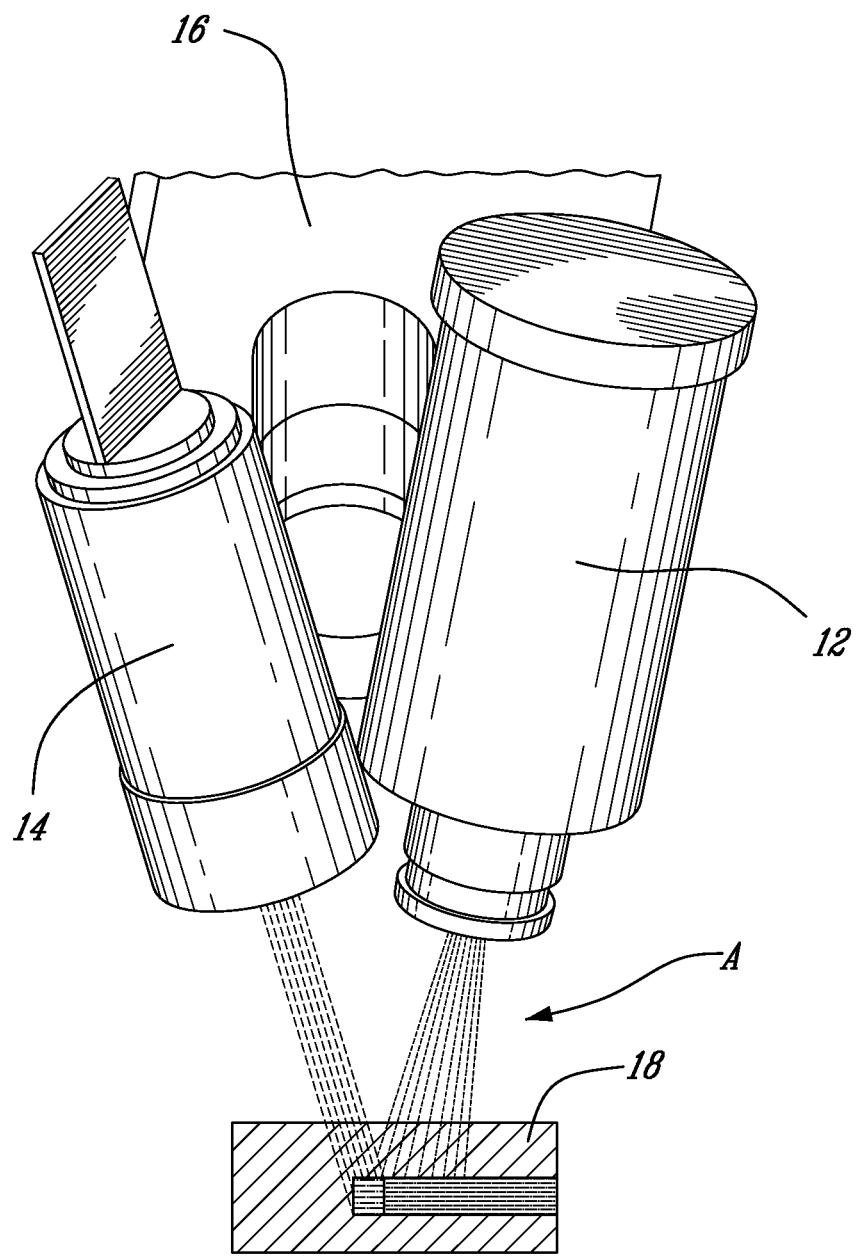
FIG. 3 is a schematic view of a system according to an embodiment of an aspect of the present invention.

A system according to an embodiment of another aspect of the present invention, as illustrated in FIG. 3, comprises a cold spray unit 12 and a laser source 14.

A robot, automaton or handling system 16 controls the relative movement between, on the one hand, the cold spray unit 12 and the laser source 14, and, on the other hand, a substrate 18 to be coated (see arrow A).

The laser source 14 is used to clean the surface of the substrate 18, as discussed hereinabove. The laser power and repetition rate need to be adjusted so as to be effective for cleaning the surface of the substrate 18, while remaining low enough so as to prevent damaging the surface of the substrate 18 and allowing good productivity. The laser source 14 may also be used for increasing the cohesion between successive layers of coating, and for further activation of a last layer of coating by optimizing the surface finish of this last layer of coating, by increasing the roughness thereof for example, which results in increasing the effective surface of the electrode and thus the electrolytic efficiency.

The cold spray unit 12 is used for deposition of the coating, thereby limiting the risks of oxide growth at the surface of the coating, as described hereinabove. The coating may be formed in successive layers, depending on the size of the electrode and/or in order to reduce residual stresses that may cause delamination for example. With the cold spray process, presence of oxides on the surface is prevented, which allows canceling the step of activation usually necessary in presence thereof by dissolving oxide layers in a hydrogen fluoride solution for example to eliminate the passive surface condition. As known in the art, such an activation step is critical, since it may deteriorate the coating altogether. As people in the art will appreciate, cancellation of this step increases the production rate and costs.

By combining deposition of coating(s) and preparation of the surface, the present invention thus allows obtaining adherent coatings, of a good stability, of a nanocrystalline material with a composition and a structure similar to those of the initial powders; obtaining an interface between the substrate and the coatings free of native oxides, and increasing the adhesion of the coatings to the substrate.

The present method and system provide preparing nanocrystalline Ti—Ru—Fe—O powders, which electrocatalytic properties allow significantly reducing the cathodic overpotential in electrolysis cells used for synthesis of sodium chlorate. Electrodes from nanocrystalline Ti—Ru—Fe—O deposited on standardly used substrates in the industry, such as mild steel and titanium substrates, of dimensions of the order of 500 $cm^2$ or larger, as needed in industrial applications, are fabricated, using a minimized amount of ruthenium as mentioned hereinabove. In particular, the present invention allows fabricating electrodes with a cathodic overpotential for hydrogen evolution reduced compared to that obtained using steel electrodes in the industry (−900 mV), by at least −300 mV for example, i.e. a cathodic overpotential less than −600 mV (at a current density of −250 mA $cm^{-2}$), which corresponds to a reduction of about 10% of the voltage between the electrodes of the electrochemical cells, which is typically between 3.0 and 3.2 volts for a current density of −250 mA $cm^{-2}$, and an increased long-term stability, for example, in an accelerated aging tests consisting of a series of fifty 10-minutes long cycles of polarization of the electrode at a current density of $j=-250$ mA $cm^{-2}$, followed by a period of 10 minutes in open circuit. The present electrodes also meet with success long-term (1 month) electrolysis tests, maintaining a cathodic overpotential less than −600 mV for example (at a current density of −250 mA $cm^{-2}$). Long-term stability of both the coating covering and the cathodic overpotential may reach up to 5 years.

The present method and system provide deposition of nanocrystalline Ti—Ru—Fe—O powders on electrodes, the composition, structure and morphology of the powders of these powders causing a good electrocatalytic activity. By cold spraying, they allow deposition of materials reacting with oxygen, such as titanium and iron, and materials sensitive to temperature, such as nanocrystalline powders. Such electrodes have a cathodic overpotential lower than that of industrial iron electrodes currently used, which allows savings of more than 10% of electric energy consumption by weight unit of $NaClO_3$, which constitutes a huge saving on a global scale.

Although the above was described mostly in relation to sodium chlorate synthesis, the present method and system may be applied to obtain a range of nanocrystalline catalysts made by mechanosynthesis, in particular to obtain coatings based on nanocrystalline catalysts requiring long-term stability and adhesion for industrial applications, such as Cu-based coatings as mentioned hereinabove in relation to aluminium electrolysis for example. For sodium chlorate synthesis, a number of catalytic compositions may be used, such as Al—Ru—Fe electrodes. In this case, as with Ti—Ru—Fe—O described hereinabove, Ru may be substituted by another metal such as Ir for example.

The present method and system allow reducing the amount of catalytic coating to be deposited by provision of an undercoating for example, which further allows long-term stability in industrial conditions for a range of high-performance catalysts.

Generally, the present method and system may be used to fabricate electrodes made from nanocrystaline powders, which, as described hereinbefore, can get increasingly difficult as the size of the required electrodes increases.

As people in the art are now in a position to appreciate, the present invention provides a method and system for producing electrode material and high-efficiency electrodes.

Although the present invention has been described hereinabove by way of specific embodiments thereof, it can be modified, without departing from the nature and teachings of the subject invention as recited below.

REFERENCES

[1] M. Blouin, M. L. Tremblay, A. Bercier, L. Roué, D. Guay, R. Schulz, L. M. D. Cranswick, I P. Swainson (2007), "Effect of boron on the structural and electrochemical properties of nanocrystalline $Ti_2RuFeB_x$ electrodes", Electrochim. Acta, 52, 4497-4505, doi: 10.1016/j.electacta.2006.12.046.

[2] M. L. Tremblay, C. Chabanier, D. Guay (2005), "Effect of chromium additives to nanocrystalline Ti:Ru:Fe:O on the reduction of hypochlorite", J. Electrochem. Soc., 152, E265-E272.

[3] E. Irissou, M. Blouin, L. Roué, J. Huot, R. Schulz, D. Guay (2002), "Plasma-sprayed nanocrystalline Ti—Ru—Fe—O coatings for the electrocatalysis of hydrogen evolution reaction", J. Alloys and Compounds, 345, 228-237.

[4] J. J. Sunol, M. E. Bonneau, L. Roué, D. Guay, R. Schulz (2000), "XPS surface study of nanocrystalline Ti—Ru—Fe materials", Appl. Surf. Sci., 158, 252-262.

[5] L. Roué, D. Guay, R. Schulz (2000), "Hydrogen electrosorption in nanocrystalline Ti-based alloys", J. Electroanal. Chem., 480, 64-73.

[6] L. Roué, M. E. Bonneau, D. Guay, M. Blouin, R. Schulz (2000), "Effect of oxygen and titanium contents on the stability of nanocrystalline Ti—Ru—Fe—O used as cathode materials for chlorate electrolysis", J. Appl. Electrochem., 30, 491-498.

[7] M. Blouin, D. Guay, R. Schulz (1999), "Kinetics of nanocrystalline $Ti_2RuFe$ alloy formation in presence of an oxide phase", J. Mater. Sci., 34, 5581-88.

[8] H. Razafitrimo, M. Blouin, L. Roué, D. Guay, R. Schulz (1999), "Large specific surface area nanocrystalline Ti—Ru—Fe cathode materials for sodium chlorate", J. Appl. Electrochem., 29(5) 627-635.

[9] L. Roué, E. Irissou, A. Bercier, S. Bouaricha, M. Blouin, D. Guay, S. Boily, J. Huot, R. Schulz (1999), "Comparative study of nanocrystalline $Ti_2RuFe$ and $Ti_2RuFeO_2$ electrocatalysts for hydrogen evolution in long-term chlorate electrolysis conditions", J. Appl. Electrochem., 29(5) 551-560.

[10] M. Blouin, D. Guay, J. Huot, R. Schulz, I. P. Swainson (1998), "X-ray and neutron diffraction study of nanocrystalline Ti—Ru—Fe—O compounds", Chem. Mater., 10 (11) 3492-3497.

[11] L. Roué, D. Guay, R. Schulz (1998), "Electrochemical behavior of nanocrystalline $Ti_2RuFe$ alloy prepared by high energy ball-milling", J. Electroanal. Chem., 455, 83-92.

[12] M. Blouin, D. Guay, R. Schulz (1998), "Effect of oxygen on the structural and electrochemical properties of Ti—Ru—Fe alloy prepared by mechanical alloying", Nanostructured Materials, 10(4) 523-541.

[13] S.-H. Yip, D. Guay, S. Jin, E. Ghali, A. Van Neste, R. Schulz (1998), "Structural and electrochemical properties of Ti—Ru—Fe—O alloys prepared by high energy ball-milling", J. Mater. Res., 13, 1171-1176.

[14] M. Blouin, D. Guay, J. Huot, R. Schulz (1997), "High energy ball-milled $Ti_2RuFe$ electrocatalyst for hydrogen evolution in the chlorate industry", J. Mater. Res., 12(6) 1492-1500.

[15] S. Helle, B. Davis, D. Guay, L. Roué (2010), "Electrolytic production of aluminum using mechanically alloyed Cu—Al—Ni—Fe based materials as inert anodes", J. Electrochem. Soc., 157_11_E173-E179.

[16] S. Helle, M. Pedron, B. Assouli, B. Davis, D. Guay, L. Roué (2010), "Structure and high-temperature oxidation behavior of Cu—Ni—Fe alloys prepared by high-energy ball milling. Application as inert anodes for aluminum electrolysis", Corrosion Science, 52, 3348-3355.

[17] S. Helle, B. Brodu, B. Davis, D. Guay, L. Roué (2010), "Ball-milled materials as inert anodes for aluminum production in KF—AlF3 low-temperature electrolyte", TMS Light Metals, 935-938.

[18] B. Assouli, M. Pedron, S. Helle, A. Carrere, D. Guay, L. Roué (2009), "Mechanically alloyed Cu—Ni—Fe based materials as inert anode for aluminium production", Light Metals 2009, 11-41-44.

The invention claimed is:

1. A method for producing nanocrystalline electrocatalytic coatings on an electrically conductive substrate for sodium chlorate synthesis, comprising:
   a) preparing a nanocrystalline catalytic powder of a powder size comprised between 1 and 60 μm; and
   b) combining cleaning the surface of the electrically conductive substrate and cold spraying the nanocrystalline catalytic powder on the surface of the electrically conductive substrate by one of: i) cold spraying the nanocrystalline catalytic powder and non-adhering materials on the surface of the electrically conductive substrate and ii) cold spraying the nanocrystalline catalytic powder and a ceramic on the surface of the electrically conductive substrate, and iii) cold spraying the nanocrystalline catalytic powder while submitting the surface of the electrically conductive substrate to laser ablation.

2. The method of claim 1, wherein said step a) comprises preparing a nanocrystalline catalytic powder of a powder size comprised between 5 and 20 μm.

3. The method of claim 1, wherein said step b) comprises cold spraying the nanocrystalline catalytic powder and submitting the surface of the electrically conductive substrate to laser ablation.

4. The method of claim 1, wherein said step b) comprises cold spraying the nanocrystalline catalytic powder and non adhering materials on the surface of the electrically conductive substrate.

5. The method of claim 1, wherein said step b) comprises cold spraying the nanocrystalline catalytic powder and a ceramic on the surface of the electrically conductive substrate.

6. The method of claim 1, wherein said electrically conductive substrate is titanium or mild steel.

7. The method of claim 1, wherein said step b) further comprises cold spraying at least one under-coating on the surface of the electrically conductive substrate.

8. The method of claim 1, wherein said step a) further comprises preparing Ti—Ru—Fe—O powders and step b) further comprises selecting an electrically conductive substrate of titanium or mild steel, and cold spraying the Ti—Ru—Fe—O powders.

9. The method of claim 8, wherein said step b) further comprises spraying stainless steel powders, titanium powders or combination thereof on the surface of the electrically conductive substrate prior to cold spraying the Ti—Ru—Fe—O powder.

10. The method of claim 1, wherein said step b) further comprises depositing on the surface of the electrically conductive substrate at least one layer of the nanocrystalline catalytic powder.

11. The method of claim 1, wherein said step b) further comprises depositing, on the surface of the electrically conductive substrate, at least one under-coating and at least one layer of the nanocrystalline catalytic powder.

12. The method of claim 1, wherein said step b) forms, on the electrically conductive substrate, a coating of a tensile strength of at least 3000 psi.

13. The method of claim 1, wherein said step b) forms on the electrically conductive substrate a coating at a deposition rate comprised in a range between 5 and 75 g/min.

14. The method of claim 1, wherein said step b) forms a nanocrystalline electrocatalytic coating on a surface of 500 $cm^2$ or larger.

15. The method of claim 2, wherein said step b) further comprises depositing, on the surface of the electrically conductive substrate, at least one under-coating, and at least one layer of the nanocrystalline catalytic powder of a thickness of at most 5 μm.

16. A method for producing nanocrystalline electrocatalytic coatings on an electrically conductive substrate, comprising:
   a) preparing a nanocrystalline catalytic powder of a powder size comprised between 1 and 60 μm; and
   b) combining cleaning the surface of the electrically conductive substrate and cold spraying the nanocrystalline catalytic powder on the surface of the electrically conductive substrate;
   wherein said step b) comprises submitting the surface of the electrically conductive substrate to laser ablation.

* * * * *